(No Model.)
C. J. HOOPER.
FEED MECHANISM FOR COTTON SEED MILLS.
No. 288,809. Patented Nov. 20, 1883.
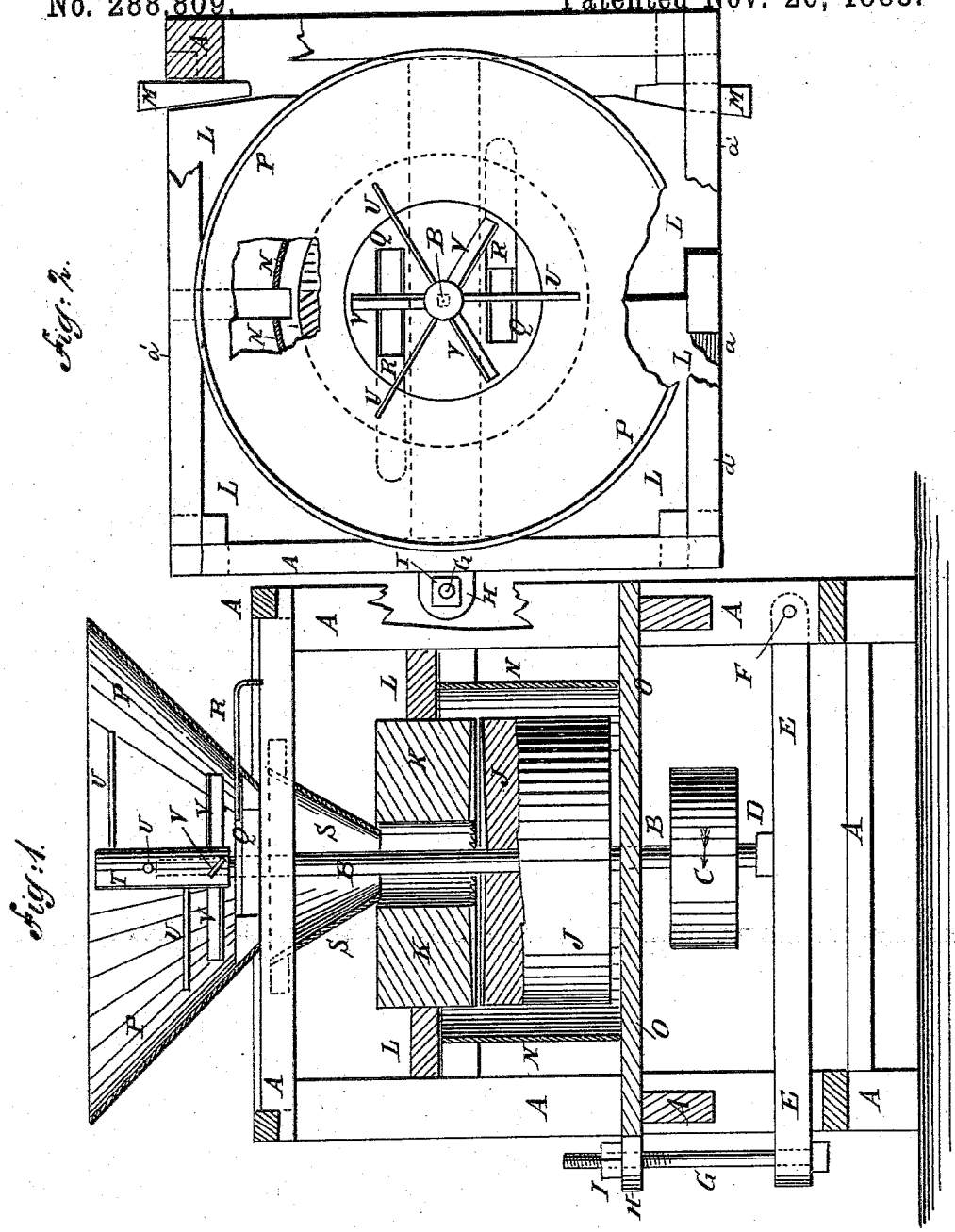
WITNESSES:
INVENTOR:
C. J. Hooper
BY Munn & Co.
ATTORNEYS.

UNITED STATES PATENT OFFICE.

CHARLES JEFFERSON HOOPER, OF EDINBURG, MISSISSIPPI.

FEED MECHANISM FOR COTTON-SEED MILLS.

SPECIFICATION forming part of Letters Patent No. 288,809, dated November 20, 1883.

Application filed July 19, 1883. (No model.)

*To all whom it may concern:*

Be it known that I, CHARLES JEFFERSON HOOPER, of Edinburg, in the county of Leake and State of Mississippi, have invented certain new and useful Improvements in Feed Mechanism for Cotton-Seed Mills, of which the following is a full, clear, and exact description.

Reference is to be had to the accompanying drawings, forming part of this specification, in which similar letters of reference indicate corresponding parts in both the figures.

Figure 1 of the drawings is a sectional elevation of a cotton-seed mill, showing my improved feed mechanism. Fig. 2 is a plan view of the same, parts being broken away.

The object of this invention is to facilitate the feeding of cotton-seed to the grinding-mill as it comes from the gin, the said seed being intended for use as a fertilizer and for feed.

A represents the frame of the mill. B is the spindle, to the lower part of which is attached a pulley, C, to receive a driving-belt from any convenient power. The lower end of the spindle B revolves in a step, D, attached to a bar, E, which is hinged at one end to the mill-frame A by a bolt or pin, F. The other end of the bar or tree E is supported by a bolt, G, which passes through it and through a lug, bracket, or bar, H, attached to or forming a part of the mill-frame A, so that by turning the nut I of the bolt G the spindle B can be raised and lowered to adjust the millstones J K closer together or farther apart, as may be required. The lower stone or runner, J, is attached to the spindle B, so as to be carried around by and with said spindle B in its revolution. The upper or stationary stone, K, is held in place by a clamping-frame, L, supported on rigid frame-bars *a a*, held down by detachable bars *a' a'*, and made in two sections movable toward one another by wedge-keys M, so that the said stone K can be trued by adjusting the said wedges. The stone J and the lower part of the stone K are surrounded by a curb, N, to confine the meal, and the lower edge of which rests upon a platform, O, placed a little below the stone J, and secured to the frame A. The platform O is made with the usual discharge-outlet, to which the meal is carried by a plate or scraper so attached to the side of the runner as to sweep the platform between the runner J and curb N. It, however, forms no part of my invention.

The parts above described, and the illustration thereof on the drawings, are given in the interest of a clear understanding of the location of my improved feeding mechanism in the mill for which it is especially designed, but constitute no portion of my invention.

To the upper part of the mill-frame is attached the hopper P, in the bottom of which are formed discharge-slots Q, which are provided with slides R, so that the discharge of the seed can be regulated and prevented by adjusting the said slides. The seed is conducted from the discharge-slots Q to the millstones K J by the funnel-shaped spout S, the large upper end of which is attached to the mill-frame A just below the bottom of the hopper P, and its small lower end enters the eye of the millstone K. The upper end of the spindle B projects into the hopper P, and to it is secured, by a pin, a set-screw, or other suitable means, a sleeve, T, to which are attached radial pins U, which are arranged spirally, so as to keep the cotton-seed loose and feed the said seed downward toward the bottom of the said hopper, and detain any loose fibers of cotton that may be in the seed. To the lower part of the sleeve T are attached inclined paddles V, to force the seed downward through the discharge-openings Q, so as to secure a continuous and uniform feed.

I am aware that it is very old to use stirrers in hoppers; but

What I do claim as new and of my invention is—

The combination of a hopper having a flat bottom provided with two diametrically-opposite openings, Q Q, a centrally-revolving shaft, and a sleeve, T, provided with the paddles V, said paddles being inclined to feed the seed into said openings, as described.

CHARLES J. HOOPER.

Witnesses:
M. E. CADENHEAD
LOUIS HOWARD.